United States Patent [19]
Farries et al.

[11] Patent Number: 5,699,468
[45] Date of Patent: Dec. 16, 1997

[54] BRAGG GRATING VARIABLE OPTICAL ATTENUATOR

[75] Inventors: Mark Farries, Nepean; Stephen J. Mihailov; Koichi Abé, both of Ottawa; Gary S. Duck, Nepean, all of Canada

[73] Assignee: JDS Fitel Inc., Nepean, Canada

[21] Appl. No.: 672,929

[22] Filed: Jun. 28, 1996

[51] Int. Cl.⁶ .................. G02B 6/10; G02B 6/00
[52] U.S. Cl. ........................... 385/140; 385/37
[58] Field of Search ..................... 385/8, 16, 35, 385/37, 140, 141, 12, 73.1; 359/177, 110, 160, 161, 174, 179, 341

[56] References Cited

U.S. PATENT DOCUMENTS

| | | | |
|---|---|---|---|
| 4,807,950 | 2/1989 | Glenn et al. | 350/3.61 |
| 5,007,705 | 4/1991 | Morey et al. | 350/96.29 |
| 5,446,809 | 8/1995 | Fritz et al. | 385/17 |

OTHER PUBLICATIONS

Variable-spectral-response optical waveguide Bragg grating filters for optical signal processing Hill; Malo, Bilodeau; Theriault; Johnson; Albert Optic Letters, vol. 20, No. 12, Jun. 15, 1995.

*Primary Examiner*—Akm E. Ullah
*Attorney, Agent, or Firm*—Neil Teitelbaum & Associates

[57] ABSTRACT

An attenuator capable of controllably attenuating at least two wavelengths of light is configured to have an optical waveguide section having at least two Bragg gratings disposed therein in series. The Bragg gratings have a sloped reflectivity response within a predetermined wavelength range. The sloped response is a function of refractive index variations within each of the grating elements. By compressing or expanding at least one of the gratings, the periodicity is modified so as to shift its central wavelength within a predetermined wavelength range.

18 Claims, 4 Drawing Sheets

BRAGG GRATING VARIABLE OPTICAL ATTENUATOR

FIELD OF THE INVENTION

This invention relates generally to a Bragg grating disposed within a waveguide and more particularly, the principal focus of this invention relates to but is not limited to Bragg gratings embedded in the core of an optical fibre.

BACKGROUND OF THE INVENTION

Various constructions of optical filters are known however so-called Bragg filters are gaining popularity. One type of a Bragg filter, which has been developed for sensing stress and/or temperature changes in structures is incorporated or embedded in the core of an optical fiber by a method disclosed, for instance, in U.S. Pat. No. 4,807,850. As is discussed in this patent permanent periodic gratings of this kind can be provided or impressed in the core of an optical fibre by exposing the core through the cladding to the interference pattern of two coherent beams of ultraviolet light that are directed against the optical fibre symmetrically to a plane normal to the fiber axis. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute the Bragg grating. The embedded Bragg grating of this kind reflects the light launched into the fiber core for guided propagation therein, in a propagation direction; only that light having a wavelength within a very narrow range dependent on the grating element periodicity is reflected back along the fibre axis opposite to the original propagation direction, while being substantially transparent to light at wavelengths outside the aforementioned narrow band so that it does not adversely affect the further propagation of such other light. In effect, this type of grating creates a narrow notch in the transmission spectrum, and by the same token a similarly narrow peak in the reflection spectrum. In the applications for which this kind of Bragg filter has been developed, any stresses or temperature changes encountered at the location of the structure in which the Bragg filter is embedded affect the grating and change its periodicity, or the index of the refraction of the material of the core, or both so that the position of the central wavelength in the spectrum is shifted, thus providing an indication of the stress or temperature changes existing or taking place in the structure being monitored at the location of the grating. Although the significance of these applications of Bragg gratings are formidable, further development in this area is disclosed in U.S. Pat. No. 5,007,705 (hereafter referred to as the '705 patent) that relates to a different aspect or use of these earlier discovered principles. In the '705 patent various means are disclosed for intentionally shifting the reflection wavelength response of a Bragg grating. By deliberately varying the period of the grating or altering the index of refraction in a predetermined manner, by external forces or actions on the fibre section containing the grating in a controlled manner, a variable light filtering element is provided. Furthermore, tuning a grating by various means such as the application of heat, compression, or stretching are all known.

One useful application of the principals described heretofore, can be found in U.S. Pat. No. 5,446,809 in the name of Fritz et al. who discloses an optical fiber wavelength selective optical switch, utilizing tunable Bragg fibre gratings. The fiber wavelength selective switch has one or more 1×N input optical couplers and utilizes a plurality of in-line Bragg fiber gratings in series along multiple parallel paths. For a given wavelength of light to pass through a particular grating, the grating must be detuned. By providing a plurality of Bragg gratings in series, each designed to reflect a different wavelength, and having means for controlling or shifting the response of each grating individually, signals can selectively be passed through a fibre or can be reflected backwards in a binary on-off fashion.

Although the prior art describes a plurality of modes and means for varying the output response of a Bragg grating within an optical fibre, there remains a need for useful application of this technology that provides a non-binary response. For example, there remains a need for a variable attenuator or equalizer that utilizes Bragg grating technology.

Therefore, it is an object of this invention to provide an optical equalizer that incorporates Bragg gratings.

It is yet a further object of the invention to provide a multi-channel equalizer.

SUMMARY OF THE INVENTION

In accordance with the invention, there is provided, an attenuator capable of controllably variably attenuating at least two wavelengths of light independently, comprising: an optical waveguide section having a plurality of Bragg grating elements disposed therein in series, at least two Bragg grating elements having an inclined or sloped reflectivity response within a predetermined wavelength range that is determined by the periodicity and refractive index variations of the grating elements; and, means for so applying at least to one grating element of the optical waveguide section an external influence to modify the periodicity of the at least one grating element to shift its central wavelength within a predetermined wavelength range.

In accordance with the invention, there is provided, an attenuator capable of controllably attenuating at least two wavelengths of light independently, comprising: an optical waveguide section having a plurality of Bragg grating elements disposed therein in series, at least two Bragg grating elements having a sloped reflectivity response within a predetermined wavelength range that is determined at least in part by refractive index variations of the grating elements; and means for so applying at least to one grating element of the optical waveguide section an external influence to modify a periodicity of the at least one grating element to shift its central wavelength within a predetermined wavelength range.

In accordance with the invention, there is further provided, a wavelength selective optical attenuator for attenuating an input signal having a predetermined wavelength, comprising: an optical waveguide having an input port and an output port; at least one optical reflective element located along said optical waveguide between the input port and the output port, said reflecting element reflecting a predetermined wavelength band of light centred at a predetermined central wavelength, said central wavelength being at a base wavelength when said reflective element is not detuned, said base wavelength including a predetermined offset corresponding to the predetermined wavelength of said input signal, said optical reflective element having a reflectivity along its length that varies such that one end of the grating is substantially more reflective than another end; and, tuning means, attached to said reflective element for detuning said central wavelength away from said base wavelength and towards the wavelength of the input signal so as to attenuate said corresponding wavelength of said input signal.

BRIEF DESCRIPTION OF THE DRAWINGS

Exemplary embodiments of the invention will now be described, in conjunction with the drawings, in which.

DETAILED DESCRIPTION

Figure 1:
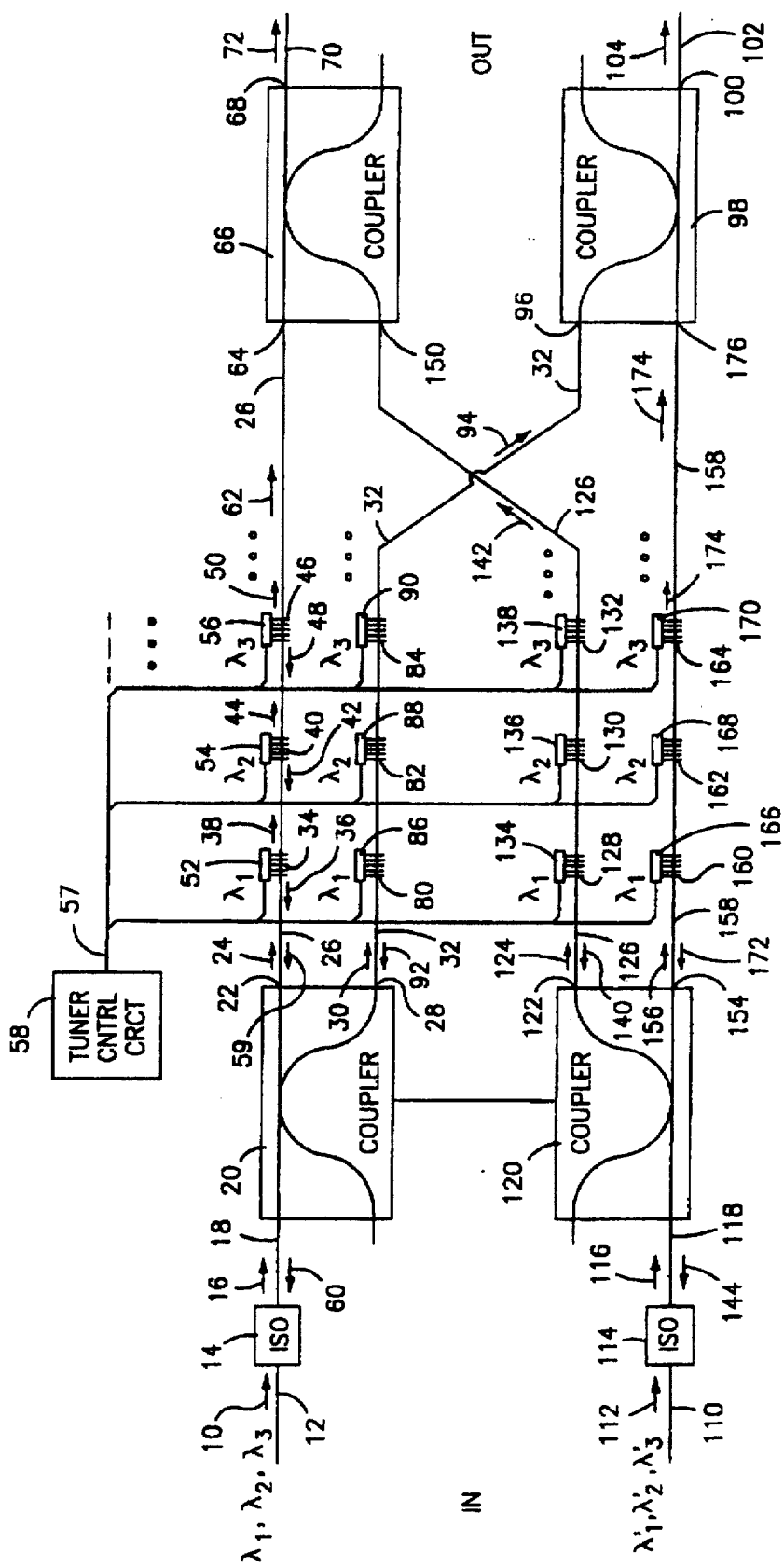
FIG. 1 is a prior art schematic block diagram of an all fiber 2×2 wavelength selective optical switch utilizing tunable Bragg gratings as selective switching elements.

As was described heretofore, U.S. Pat. No. 5,446,809 discloses an optical switch shown in FIG. 1, wherein Bragg gratings are used as controllable, selective, transmissive/ reflective binary elements that are capable of transmitting a predetermined wavelength of light or alternatively reflecting that wavelength in dependence upon the period of the grating. A piezo-electric transducer is coupled to each grating; and when a particular transducer is energized it stretches the grating, changing its period, and thus changes its reflectivity response by shifting it in wavelength. In this patent the Bragg gratings operate in a binary "on-off" manner to either reflect a particular wavelength of light or transmit that wavelength of light.

Figure 2A:
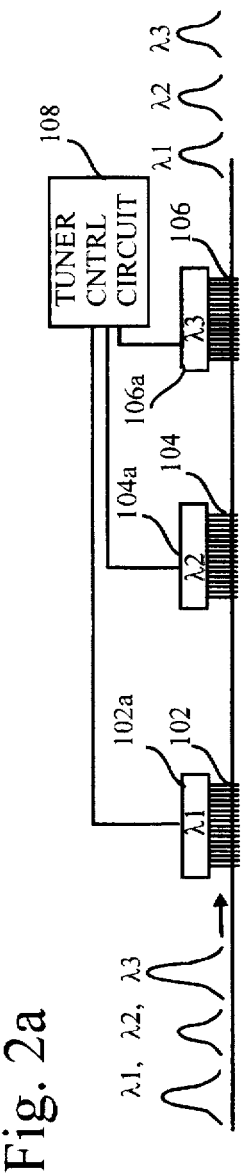
FIG. 2a is a schematic block diagram of multi-channel equalizer in accordance with an embodiment of the invention.
Figure 2B:
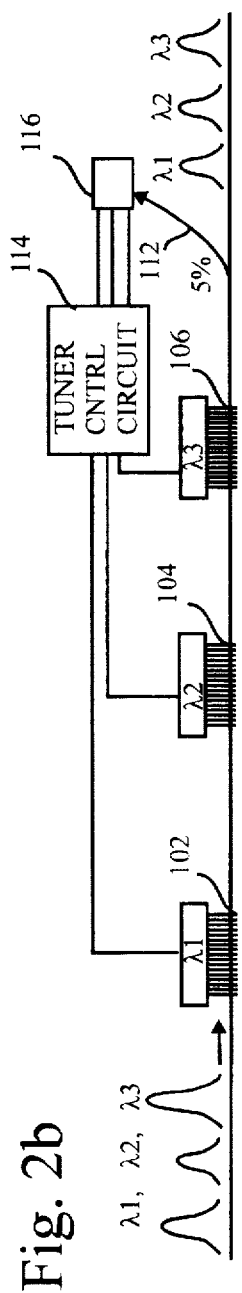
FIG. 2b is a schematic block diagram of multi-channel equalizer including feedback circuitry in accordance with an alternative embodiment of the invention.
Figure 2C:
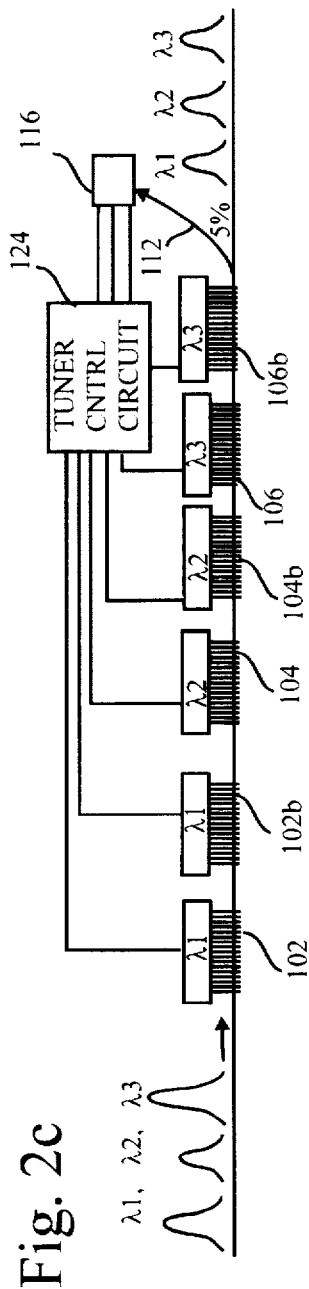
FIG. 2c is a schematic block diagram of multi-channel equalizer similar to that shown in FIG. 2b however including 3 couplets of Bragg gratings.

Referring generally now to FIGS. 2a to 2c, an equalizer circuit is shown wherein Bragg gratings or elements are utilized in a controllable manner to attenuate a multiplexed input optical beam comprising three signals of three wavelengths, λ1, λ2, and λ3. In the drawing, the three signals on the left side are unequal in amplitude, λ2 having the least intensity, then λ1 followed by λ3 having the highest intensity. In many instances it is preferred to have the optical signals equalized, wherein their amplitudes are as close as possible to one another. One use of the equalizer of this invention is with rare-earth doped optical fiber amplifiers.

One limitation of any rare-earth doped optical fibre amplifier is unequal gain over a range of frequencies or optical channels of interest, as well as for various input signal strengths (i.e. different saturation levels). Over a 35 nanometer gain bandwidth, erbium doped fibre amplifiers (EDFAs) typically exhibit a 10 to 15 dB small-signal gain variation. In long chains of cascaded EDFAs small spectral gain variation can result in unacceptable large difference in received optical power and therefore, it is preferable to lessen even small spectral variation in gain.

To date, several gain equalization and flattening techniques have been proposed and described in a variety of prior art references. For example, gain clamping with enhanced inhomogeneous saturation is described by V.S.da Silva et al in Proc. OFC'93. paper THD2, P.174, 1993. One of the limitations of this method is the requirement that fibre be cooled to 77 K. The use of passive internal/external filters has been explored by M. Tachibana, et al in IEEE Photonics Technol. Lett. 3, no. 2, 118, 1991, by M. Wilkinson et al. in Electron. Lett. 28, no. 2, p. 131, 1992, and by Kashyap et al in Electron. Lett. 29, no. 2, P.154, 1993, and as well by Grasso et al, in Proc. OFC'91, paper FA3, p. 195, 1991. Another attempt to provide a doped optical fibre amplifier that is suitable for use over a range of frequencies is described in U.S. Pat. No. 5,245,467 entitled Amplifier with a Samarium-erbium Doped Active Fibre, issued Sep. 14, 1993 in the name of Grasso et al. Although the invention described in the patent works well at particular wavelengths and for particular signal strengths, it has been found to be limited at other wavelengths. However, a major limitation with most of these devices and methods is the requirement for bulk optics and non-standard components. The use of external active acousto-optic filters has been explored by S. F. Su et. al in IEEE Photonics Technol. Lett. 4, no. 3, p.269, 1992; the drawback with this proposal is that it requires bulk optics, and is complex in design.

Figure 3A:
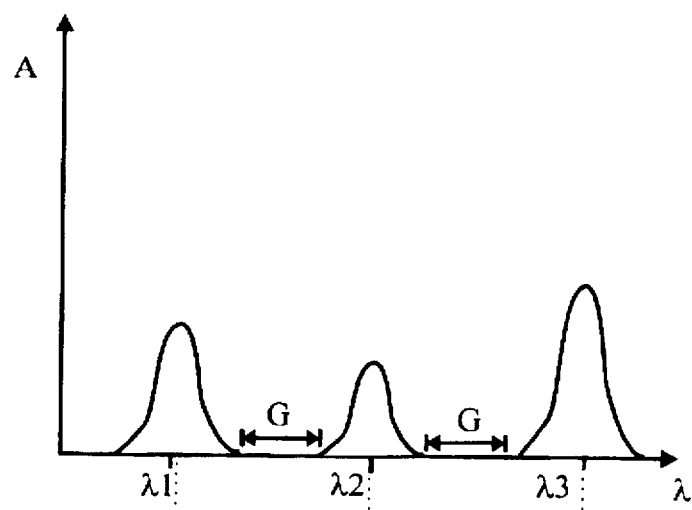
FIG. 3a is a graph showing the amplitude wavelength response of three optical signals transmitted into the multi-channel equalizer in an, unequalized form, prior to being attenuated.
Figure 3B:
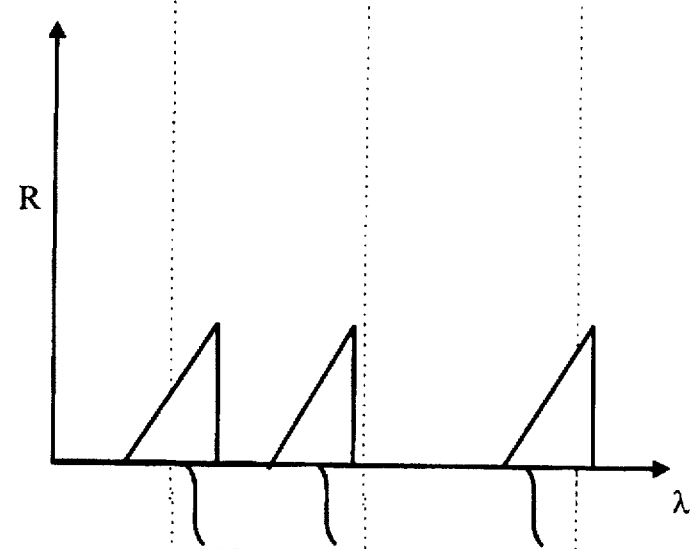
FIG. 3b is a graph showing the reflectivity wavelength response of three Bragg gratings corresponding to the circuit of FIG. 2b, including a first wavelength of which is shifted, the grating being stretched state, a second grating which is unstretched and not wavelength shifted, and a third grating which is stretched and wavelength shifted to achieve substantial attenuation of a particular wavelength of light.
Figure 3C:
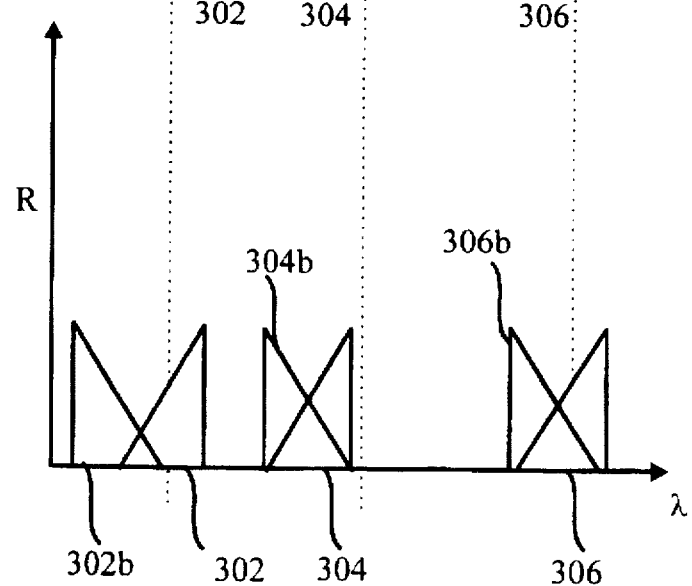
FIG. 3c is a graph showing the reflectivity wavelength response of three couplets of Bragg gratings, in accordance with the embodiment of the invention that corresponds to FIG. 2c.

The exemplary circuit shown in FIG. 2a in conjunction with the responses shown FIGS. 3b and 3c can be used to offset the unequalized gain over a wavelength region exhibited from commercially available erbium doped amplifiers; or, can be used to vary or offset the relative strengths of particular wavelengths prior to amplification so as to obtain a relatively equalized signal after amplification. Although only three Bragg gratings 102, 104, and 106 are shown, other gratings can be included and chained in series tuned to other wavelengths of interest.

Figure 4:
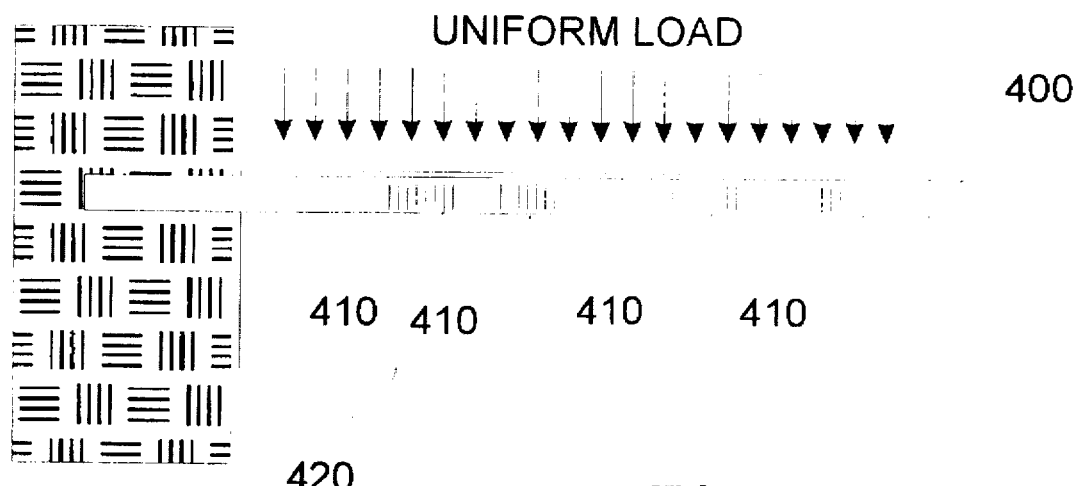
FIG. 4 is a prior art pictorial view showing the bending and stretching of a Bragg grating non-uniformly over a bending form.

Referring specifically now to FIG. 2a, a circuit is shown wherein three Bragg gratings 102, 104, and 106 are shown in series written into an optical fiber 101. Tuning means in the form of individually controllable piezo-electric transducers 102a, 104a, and 106a are coupled to the respective gratings each for changing the period of a grating in dependence upon a control signal. A tuning control circuit 108 can be preprogrammed or programmed in real-time for issuing appropriate control signals to the transducers. Each of the Bragg gratings 102, 104, and 106 are designed to have a different period, and are consequently designed to affect a different channel. In one embodiment, the gratings are chirped, appodized gratings having a sloped or inclined reflectivity response as shown in FIG. 3b. Therefore the refractive index difference Δn between adjacent regions within each of the gratings varies along the length of the chirped grating so as to provide a sloped reflectivity response over a predetermined wavelength region. Of course, other methods of forming reflective/transmissive elements having a variable reflectively response can be envisaged. One way of fabricating the grating is to provide a standard linear chirp using a mask; when exposing the fibre an amplitude mask can be utilized so that one side of the grating is exposed more so than the other, resulting in a periodicity that varies in refractive index rather than in distance, providing a variable masked chirp. The effective $\Delta n$ can be varied by varying the width of $\Delta n$ sections. Another means of providing a sloped region is by using a very short hydrogen loaded grating, for example one having a 2 nm bandwidth, can be utilized; by providing such a grating, tuning can be achieved by utilizing the falling or rising edge of the gratings reflectivity response. By tuning or wavelength shifting these gratings a variable reflectivity response and consequently a variable amount of attenuation is provided. Another means of achieving a chirp in a grating is by stretching or bending a grating having a non-varying period in non-uniform manner. For example, an optical fibre 400 having gratings 410 shown in prior art FIG. 4 are shown being bent over a form 420 having non-uniform bend radius. By doing so, the period of the grating is changed in such a manner as to vary it along its length, thereby chirping the grating. The authors of this prior art reference, Variable-spectral response optical waveguide Bragg grating filters for optical signal processing by K. O. Hill et al., Optics Letters/ Vol. 20, No. 12, Jun. 15, 1995 disclose the usefulness of non-uniformly bending a grating, in relation to signal processing applications, for example for dispersion compensation; however, we have found a particularly useful feature that is less related to the processing of optical signals. The advantage of such a scheme is as follows; a substantially long grating with a uniform period typically has a very narrow reflectivity response; thus, when the grating is un-bent, it can be hidden or stored between adjacent channels essentially "tucked away". In the instance where an adjacent channel or wavelength range is to be attenuated, the grating can be bent and thereby chirped so that range of reflectivity broadens, in a manner similar to an opening curtain. Of course by stretching or compressing the grating its effective wavelength range shifts. Thus the grating response can be compressed, expanded, and/or shifted.

Standards and specifications are provided by the telecommunications industry regarding the minimum allowable or acceptable channel spacing between two transmission channels. In some instances where it is desired to have a plurality of channels within a small wavelength region, this spacing labeled G on FIG. 3a, is relatively small. In order to provide a grating having reflectivity response that conveniently lies within this space G in one mode of operation, and that can be shifted to have a reflectivity response that coincides with the wavelength or channel of interest $\lambda 1$, $\lambda 2$, or $\lambda 3$ in a variable manner so as to attenuate a particular channel by predetermined amount, the grating must have predetermined characteristics. For example, the grating of interest must be designed to have a slope of the reflectivity response that is suitable for a particular application. FIG. 3c shows an embodiment wherein grating couplets are provided, each grating of a couplet of gratings, being tunable over substantially the same range, and wherein the couplet can share a same space G for convenient storage when no attenuation is required. In another embodiment compressive actuation means are also or alternatively coupled to each grating, or each other grating; in this arrangement one grating of a couplet can be used to attenuate an adjacent higher wavelength, while the other grating of a couplet can be utilized to attenuate an adjacent lower wavelength signal, by stretching of the gratings and compressing the other of the gratings a predetermined amount. It should be noted, that although the gratings shown are preferably impressed within an optical fibre, other optical waveguide structures can conveniently be utilized; for example a plurality of gratings can be written into a slab waveguide wherein heating elements can be used to control the wavelength reflectivity response of the gratings.

Turning now to FIG. 2b, a circuit is shown for equalizing an input beam of light. The circuit is similar in many respects to that of FIG. 2a, however includes a feedback circuit for providing information relating to the input beam after it has been attenuated. A tap, 112 taps, for example, 5% of the attenuated beam and couples this light to a circuit 116 for further processing. The tapped light is wavelength demultiplexed into three channels. The intensity of signals representing a 5% portion of wavelengths $\lambda 1$, $\lambda 2$, and $\lambda 3$ are measured by circuit 116 and converted to electrical signals by photodetectors (not shown). A tuner control circuit 114 in response to these electrical signals continuously and dynamically varies the response of the gratings 102, 104, and 106 by providing an appropriate voltage to the actuators 102a, 104a, and 106a. The circuit of FIG. 2c operates in a similar manner, however the tuner 124 provides appropriate voltages to six Bragg gratings, 102, 102b, 104, 104b, 106, and 106b.

Of course, numerous other embodiments may be envisaged, without departing from the spirit and scope of the invention.

What we claim is:

1. A variable attenuator capable of controllably attenuating at least two wavelengths of light independently, comprising:

an optical waveguide section having a plurality of Bragg grating elements disposed therein in series, at least two Bragg grating elements having a sloped reflectivity response within a predetermined wavelength range that is determined at least in part by refractive index variations of the grating elements;

and means for so applying at least to one grating element of the optical waveguide section an external influence to modify a periodicity of the at least one grating element to shift its central wavelength within a predetermined wavelength range to vary the attenuation of a wavelength of light.

2. A variable attenuator as defined in claim 1, wherein the at least two Bragg grating elements have a refractive index difference between two adjacent locations denoted as $\Delta n$, and wherein $\Delta n$ varies substantially linearly along each grating element increasing from one end to the other.

3. A variable attenuator as defined in claim 1, wherein the at least two Bragg grating elements are chirped Bragg gratings and wherein the refractive index difference between two adjacent regions of a grating element $\Delta n$ varies increasing from one end of a grating element to the other.

4. A variable attenuator as defined in claim 3, wherein two of the at least two Bragg grating elements have a substantially same central reflectivity wavelength band of light centered at a predetermined central wavelength, and wherein their wavelength reflectivity responses are oppositely sloped.

5. A variable attenuator as defined in claim 1, wherein the means to apply the external influence to modify the period of the grating effectively chirp the grating by stretching or compressing at least a portion of the grating non-uniformly.

6. A variable attenuator as defined in claim 5, wherein said means to apply the external influence includes bending means.

7. A wavelength selective variable optical attenuator for attenuating an input signal having a predetermined wavelength, comprising:

an optical waveguide having an input port and an output port;

at least one optical reflective element located along said optical waveguide between the input port and the output port, said reflecting element for reflecting a predetermined wavelength band of light centered at a predetermined central wavelength, said central wavelength being at a base wavelength when said reflective element is not detuned, said base wavelength including a predetermined offset corresponding to the predetermined wavelength of said input signal, said optical reflective element having a reflectivity along its length that varies such that one end of the grating is substantially more reflective than another end;

tuning means, attached to said reflective element for detuning said central wavelength away from said base wavelength and towards the wavelength of the input signal so as to attenuate said input signal.

8. A wavelength selective variable optical attenuator as defined in claim 7, wherein the optical reflective element is in the form of a Bragg grating having a plurality hi and low index regions adjacent to one another each adjacent hi and low index region having a refractive index difference $\Delta n$, and wherein $\Delta n$ varies substantially linearly along the grating increasing from one end to the other.

9. A wavelength selective variable optical attenuator as defined in claim 8, comprising a plurality of Bragg gratings connected in series for attenuating at least two input signals having different wavelength, at least two of the Bragg gratings reflecting different predetermined wavelength of light, the at least two Bragg gratings having a refractive index difference $\Delta n$ which varies substantially linearly along each grating increasing from one end to the other, and comprising tuning means for tuning each of said Bragg gratings independent of the other.

10. A wavelength selective variable optical attenuator as defined in claim 9, wherein at least two Bragg gratings have an oppositely sloped reflection response and have a same base wavelength.

11. A wavelength selective variable optical attenuator as defined in claim 9 including means for detecting the intensity of at least a portion of the at least two input signals that have passed through the at least two Bragg gratings.

12. A wavelength selective variable optical attenuator as defined in claim 9 wherein the optical waveguide is a planar waveguide.

13. A wavelength selective variable optical attenuator as defined in claim 11, including feedback means for controlling the tuning means in dependence upon a detected intensity of the at least a portion of the at least two input signals.

14. A wavelength selective variable optical attenuator as defined in claim 13, wherein the optical waveguide is in the form of an optical fibre.

15. A variable attenuator capable of controllably, variably, attenuating a wavelength of light independently, comprising:

an optical waveguide section having a Bragg grating element disposed therein, said Bragg grating element having reflectivity response that varies in such as manner as to provide a more than two levels of reflectively within a predetermined wavelength range that is determined at least in part by at least one of the effective periodicity and refractive index variations of the grating element;

and means for so applying to the grating element of the optical waveguide section an external influence to modify the periodicity of the at least one grating element to shift its central wavelength within a predetermined wavelength range, so that at least a section of the varied reflectivity response may be coincident with the wavelength of light to thereby only partially attenuate said wavelength of light.

16. A variable attenuator comprising an optical waveguide having a tunable Bragg grating disposed within, said grating having a reflectivity response over a predetermined wavelength range that varies between at least three different levels, and means for tuning the Bragg fibre grating so as to shift its response over that predetermined wavelength range.

17. A variable attenuator as defined in claim 16 including means for modifying the Bragg grating along the length of the grating so as to controllably increase or decrease the bandwidth of the grating.

18. A variable attenuator as defined in claim 17, wherein said means includes bending means for bending the grating non-uniformly.

* * * * *